United States Patent
Rajagopalan et al.

(10) Patent No.: US 8,886,889 B2
(45) Date of Patent: Nov. 11, 2014

(54) METHODS AND APPARATUS FOR REUSING SNOOP RESPONSES AND DATA PHASE RESULTS IN A BUS CONTROLLER

(75) Inventors: Vidyalakshmi Rajagopalan, Bangalore (IN); Archna Rai, Bangalore (IN); Sharath Kashyap, Bangalore (IN); Anuj Soni, Bangalore (IN)

(73) Assignee: LSI Corporation, San Jose, CA (US)

( * ) Notice: Subject to any disclaimer, the term of this patent is extended or adjusted under 35 U.S.C. 154(b) by 348 days.

(21) Appl. No.: 13/401,022

(22) Filed: Feb. 21, 2012

(65) Prior Publication Data

US 2013/0219128 A1 Aug. 22, 2013

(51) Int. Cl.
*G06F 12/08* (2006.01)
(52) U.S. Cl.
CPC ............ *G06F 12/08* (2013.01); *G06F 12/0833* (2013.01); *G06F 12/0831* (2013.01)
USPC ................... 711/146; 711/141; 711/E12.033; 711/E12.026

(58) Field of Classification Search
CPC .. G06F 12/0831; G06F 12/0833; G06F 12/08
USPC .......................................... 711/146, E12.033
See application file for complete search history.

(56) References Cited

U.S. PATENT DOCUMENTS

| | | | | |
|---|---|---|---|---|
| 6,631,450 | B1* | 10/2003 | Arimilli et al. | 711/146 |
| 6,779,036 | B1* | 8/2004 | Deshpande | 709/232 |
| 8,145,849 | B2* | 3/2012 | Arimilli et al. | 711/146 |
| 2009/0113098 | A1* | 4/2009 | Drerup | 710/110 |

OTHER PUBLICATIONS

U.S. Appl. No. 13/277,367, filed Oct. 20, 2011, Methods and Apparatus for Reusing Prior Tag Search Results in a Cache Controller.

* cited by examiner

*Primary Examiner* — Pierre-Michel Bataille

(57) ABSTRACT

Methods and apparatus are provided for reusing snoop responses and data phase results in a bus controller. A bus controller receives an incoming bus transaction BTR1 corresponding to an incoming cache transaction CTR1 for an entry in at least one cache; issues a snoop request with a cache line address of the incoming bus transaction BTR1 for the entry to a plurality of cache controllers; collects at least one snoop response from the plurality of cache controllers; broadcasts a combined snoop response to the plurality of cache controllers, wherein the combined snoop response is a combination of the snoop responses from the plurality of cache controllers; and broadcasts cache line data from a source cache for the entry during a data phase to the plurality of cache controllers, wherein a subsequent cache transaction CTR2 for the entry is processed based on the broadcast combined snoop response and the broadcast cache line data.

32 Claims, 10 Drawing Sheets

FIG. 2

| SIGNAL | PHASE | USAGE |
|---|---|---|
| Dphase_address | Data | Cache line address of a transaction whose data phase is in progress |
| Rphase_address | Snoop response | Cache line address of a transaction whose snoop response phase is in progress |
| NO_ALLOC[CACHEn] | Both Data and Snoop response | CACHEn can make use of the data but not allocate. This signal is sent by bus controller to all peer caches and the caches that have pending READ operations can make use of this data without allocating the cache line. |
| INVALIDATE[CACHEn] | Both Data and Snoop response | Bus controller identifies all the caches that have a copy of the cache line from their respective snoop responses. All caches that have a copy of the cache line should invalidate the cache line as the bus controller is going to source this data for a write which is pending in its queue. CACHEn can make use of this signal to invalidate the cache line when bus controller sets this signal (INVALIDATE[CACHEn] to logic level '1'. |

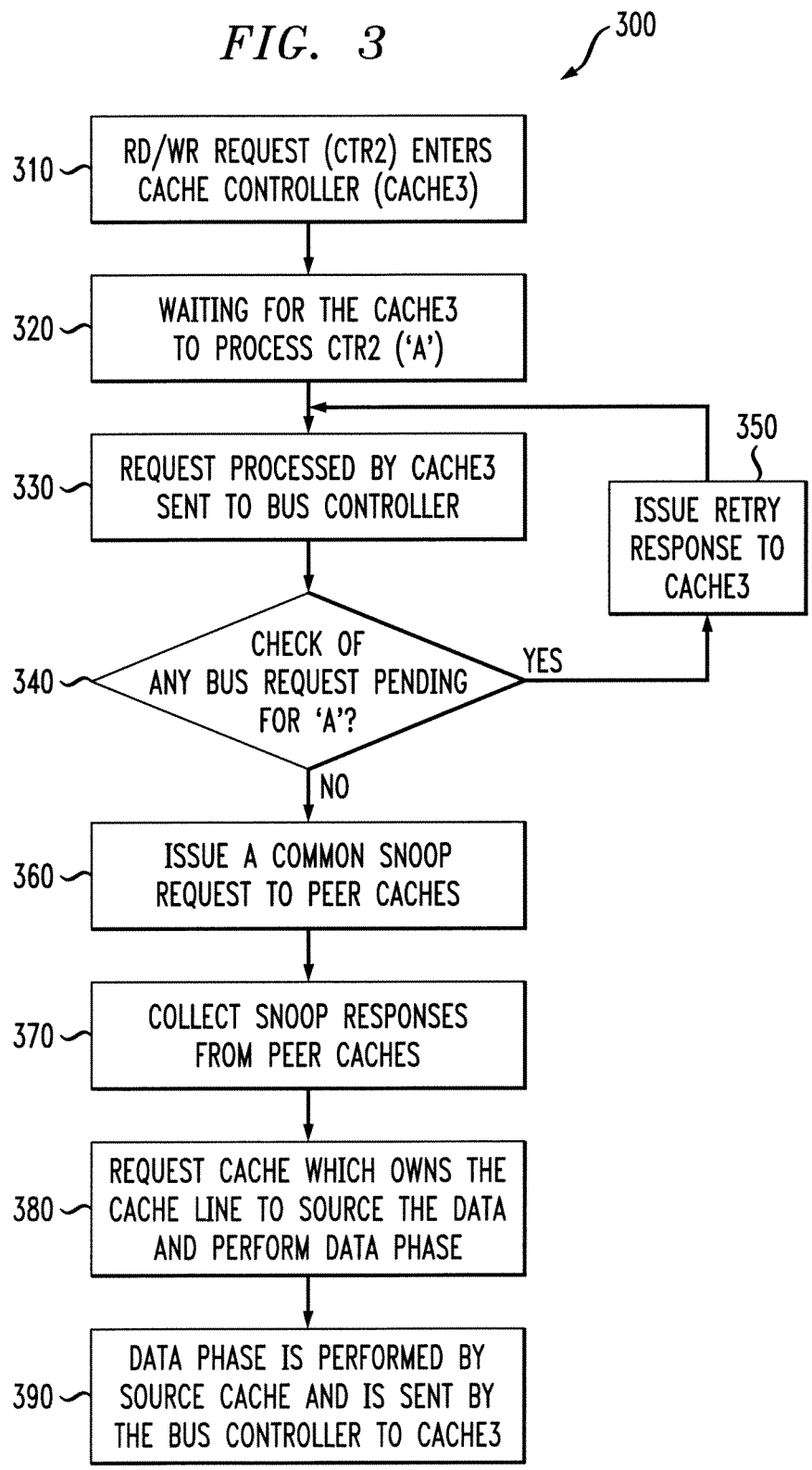

FIG. 5

| CTR1 (ISSUED BY CACHE 2) | CTR2 (ISSUED BY CACHE 3) | BUS TRANSACTION DETAILS | SAVINGS |
|---|---|---|---|
| PR | PR | Common bus read is issued | |
| PW | PR | Common bus write is issued. cache3 is informed not to allocate through the sideband signal NO_ALLOC[CACHE3] | [BUS_CTRL_DLY_BTR2 − BUS_CTRL_DLY_BTR1] + RPhase_DLY + DPhase_DLY |
| PR | PW | Common bus write is issued. cache2 is informed not to allocate through the sideband signal NO_ALLOC[CACHE2] | |
| PW | PW | Bus controller takes in the bus transaction which arrives first and holds off the second bus transaction till the first one goes through | 0 |

| CTR1 (ISSUED BY CACHE 2) | CTR2 (ISSUED BY CACHE 3) | BUS TRANSACTION DETAILS | SAVINGS |
|---|---|---|---|
| PR | PR | Common bus read is issued. (Snoop Address phase is already issued when BTR2 reached bus controller) | [BUS_CTRL_DLY_BTR2 − BUS_CTRL_DLY_BTR1] + RPhase_DLY + DPhase_DLY |
| PW | PR | Common bus write is issued. cache3 is informed not to allocate through the sideband signal NO_ALLOC[CACHE3] | |
| PR | PW | Bus read snoop request is already issued earlier. Cache2 is informed not to allocate through the sideband signal NO_ALLOC[CACHE2] INVALIDATE[CACHE1] is used to instruct CACHE1 to invalidate along with the data phase broadcast | |
| PW | PW | Bus controller takes in the bus transaction which arrives first and holds off the second bus transaction till the first one goes through | 0 |

*FIG. 7*

| CTR1 (ISSUED BY CACHE 2) | CTR2 (ISSUED BY CACHE 3) | BUS TRANSACTION DETAILS | SAVINGS |
|---|---|---|---|
| PR | PR | PR(CTR2) is not issued on the bus as the cache sees a snoop response for the same address (during CTR1 snoop response) | Worst_BUS_CTRL_DLY_BTR + RPhase_DLY + DPhase_DLY + Bus_Gnt_DLY |
| PW | PR | PR(CTR2) is not issued on the bus as the cache sees a snoop response for the same address (during CTR1 snoop response). NO_ALLOC[CACHE3] is set to '1' to indicate CACHE3 not to allocate. NO_ALLOC needs to be used in the snoop response phase as well as in the subsequent data phase | |
| PR | PW | Bus controller takes in the bus transaction which arrives first and holds off the second bus transaction till the first one goes through | 0 |
| PW | PW | Bus controller takes in the bus transaction which arrives first and holds off the second bus transaction till the first one goes through | |

FIG. 8

| CTR1 (ISSUED BY CACHE 2) | CTR2 (ISSUED BY CACHE 3) | BUS TRANSACTION DETAILS | SAVINGS |
|---|---|---|---|
| PR | PR | PR(CTR2) is not issued on the bus as the cache sees data phase for the same address (CTR1) before it could issue the bus transaction | Worst_BUS_CTRL_DLY_BTR + RPhase_DLY + DPhase_DLY + Bus_Gnt_DLY |
| PW | PR | PR(CTR2) is not issued on the bus as the cache sees a data response for the same address (CTR1) before it could issue the bus transaction. NO_ALLOC[CACHE3] is set to '1' to indicate CACHE3 not to allocate | |
| PR | PW | Bus controller takes in the bus transaction which arrives first and holds off the second bus transaction till the first one goes through | |
| PW | PW | Bus controller takes in the bus transaction which arrives first and holds off the second bus transaction till the first one goes through | 0 |

FIG. 9

| CTR1 (ISSUED BY CACHE 2) | CTR2 (ISSUED BY CACHE 3) | BUS TRANSACTION DETAILS | SAVINGS |
|---|---|---|---|
| PR | PR | PR(CTR2) reuses the broadcast data from the data response of CTR1 and the bus controller clears CTR2 once CTR1 data phase is completed | [BUS_CTRL_DLY_BTR2 − BUS_CTRL_DLYBTR1] + RPhase_DLY + DPhase_DLY |
| PW | PR | PR(CTR2) reuses the broadcast data from the data response of CTR1 and the bus controller clears CTR2 once CTR1 data phase is completed. Also, CACHE3 is instructed not to allocate through the sideband signal NO_ALLOC[CACHE3] | |
| PR | PW | PW(CTR2) reuses the broadcast data from the data response of CTR1 and the bus controller clears CTR2 once CTR1 data phase is completed. CACHE2 is instructed not to allocate through the sideband signal NO_ALLOC[CACHE2] Also, INVALIDATE[CACHE1] is used to instruct CACHE1 to invalidate along with the data phase broadcast. | |
| PW | PW | Bus controller takes in the bus transaction which arrives first and holds off the second bus transaction till the first one goes through | 0 |

METHODS AND APPARATUS FOR REUSING SNOOP RESPONSES AND DATA PHASE RESULTS IN A BUS CONTROLLER

CROSS-REFERENCE TO RELATED APPLICATIONS

The present application is related to U.S. patent application Ser. No. 13/401,036, entitled "Methods and Apparatus for Reusing Snoop Responses and Data Phase Results in a Cache Controller," filed Feb. 21, 2012, and incorporated by reference herein.

BACKGROUND

Computer systems often contain multiple processors and a shared main memory. In addition, several cache memories (typically one cache per processor) are often employed to reduce the latency when a processor accesses the main memory. The multiple caches typically share a common bus to the main memory. Each cache memory stores data that is accessed from the main memory so that future requests for the same data can be provided to the processor faster. Each entry in a cache has a data value from the main memory and a tag specifying the address in main memory where the data value came from.

A given data value from the main memory may be stored in more than one cache, and one of the cached copies may be modified by a processor with respect to the value stored in the main memory. Thus, cache coherence protocols are often employed to manage such potential memory conflicts and to maintain consistency between the multiple caches and the main memory. For a more detailed discussion of cache coherency, see, for example, Jim Handy, The Cache Memory Book (Academic Press, Inc., 1998).

The Modified, Exclusive, Shared and Invalid (MESI) protocol is a popular cache coherence protocol that refers to the four possible states that a cache line can have under the protocol, namely, Modified, Exclusive, Shared and Invalid states. A Modified state indicates that the copy is present only in the current cache, and the cache line is dirty (i.e., the copy has been modified relative to the value in main memory). An Exclusive state indicates that the copy is the only copy other than the main memory, and the copy is clean (i.e., the copy matches the value in main memory). A Shared state indicates that the copy may also be stored in other caches. An Invalid state indicates that the copy is invalid.

Cache coherence protocols often involve bus snooping. Generally, bus snooping requires each cache controller to monitor the common bus to detect an access to a memory address that might cause a cache coherency problem. Snoop requests are messages passed among the caches to determine if the caches have a copy of a desired main memory address. The snoop requests may be transmitted by the bus controller to all of the caches in response to read or write requests. Each cache responds to the snoop request with snoop responses. While bus snooping enables cache coherence, bus snooping also consumes resources, such as power and time, and thereby reduces processor efficiency. Thus, cache coherence schemes create an overhead on memory read/write operations, including communications among the caches to maintain and update the coherence state. These communications can degrade overall system performance and increase the latency of the memory read/write operations.

A need therefore exists for improved cache coherence techniques that demonstrate reduced latency relative to conventional techniques.

SUMMARY

Generally, methods and apparatus are provided for reusing snoop responses and data phase results in a bus controller. According to one aspect of the invention, a bus controller receives an incoming bus transaction BTR1 corresponding to an incoming cache transaction CTR1 for an entry in at least one cache; issues a snoop request with a cache line address of the incoming bus transaction BTR1 to a plurality of cache controllers; collects at least one snoop response from the plurality of cache controllers; broadcasts a combined snoop response to the plurality of cache controllers, wherein the combined snoop response is a combination of the snoop responses from the plurality of cache controllers; and broadcasts cache line data from a source cache for the entry during a data phase to the plurality of cache controllers, wherein a subsequent cache transaction CTR2 for the entry is processed based on the broadcast combined snoop response and the broadcast cache line data.

A number of different cases are addressed, based on variations of the arrival sequence of the subsequent cache transaction CTR2 with respect to the earlier bus transaction BTR1. In some cases, the number of bus transactions BTRn that need to be initiated by the cache controllers is reduced, as the subsequent cache transaction CTR2 does not have to enter the bus controller (and thus BTR2 is never generated). In these cases, the subsequent cache transaction CTR2 is processed by the corresponding cache controller, making use of the information broadcast by the bus controller for the earlier bus transaction BTR1 depending on the nature of CTR2. For other cases, the subsequent cache transaction CTR2 enters the bus controller as bus transaction BTR2, and the second bus transaction BTR2 is processed with reduced bus latency and in turn improved performance by the bus controller using disclosed bus transaction merging techniques based on the phase of BTR1, using information broadcast for the same cache line to reduce the number of bus transaction phases to snooper caches.

A more complete understanding of the present invention, as well as further features and advantages of the present invention, will be obtained by reference to the following detailed description and drawings.

BRIEF DESCRIPTION OF THE DRAWINGS

FIG. 2 is a sample table illustrating exemplary sideband signals employed by an embodiment of the present invention;

FIG. 3 is a flow chart describing a conventional cache coherency process;

FIGS. 5 through 9 are sample tables illustrating the processing of two cache transactions issued by two cache controllers.

DETAILED DESCRIPTION

Aspects of the present invention provide improved cache coherency techniques that demonstrate reduced latency relative to conventional techniques. Generally, a snoop response is generated by one or more cache controllers and comprises a main memory address stored by a given cache, and the corresponding cache state based on the address of the cache line provided in the snoop request during a snoop address phase. According to one aspect of the invention, the average bus access latency of a cache transaction is improved by collecting snoop responses from a plurality of cache controllers and broadcasting a combined snoop response to all of the cache controllers for the peer caches so that each of the cache controllers do not need to issue a new bus transaction for the same cache line. According to another aspect of the invention, the average bus access latency of a cache transaction is improved by performing a single data phase for multiple outstanding bus transactions for the same cache line by broadcasting the cache line data from a source cache (e.g., the main memory address associated with the transaction that sources the data for the transaction) during a data phase to the cache controllers in the system.

Figure 1:
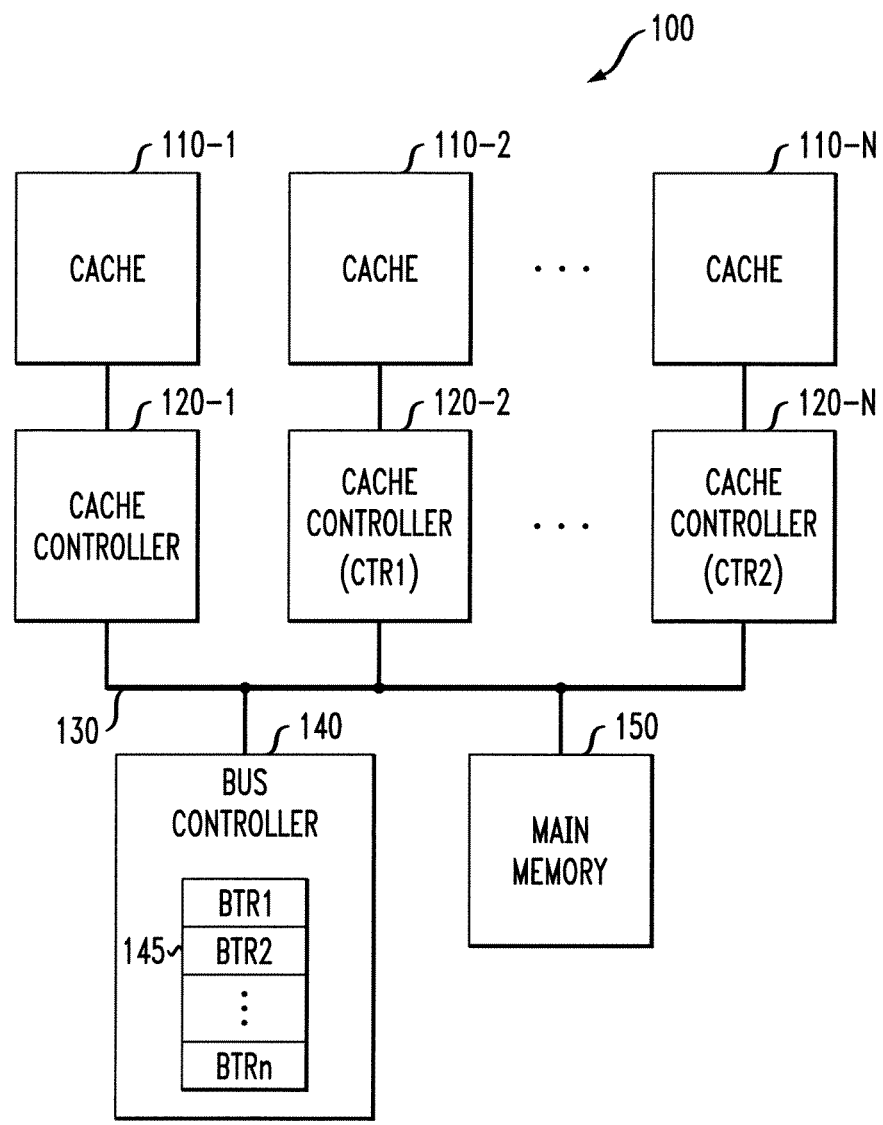
FIG. 1 illustrates a shared memory system in which the present invention may be employed.

FIG. 1 illustrates a shared memory system 100 in which the present invention may be employed. As shown in FIG. 1, the memory system 100 comprises a plurality of caches 110-1 through 110-N (collectively referred to herein as "caches 110"), each having a corresponding cache controller 120-1 through 120-N, respectively (collectively referred to herein as "cache controllers 120"), and each connected by a bus 130 that is controlled by a bus controller 140. The cache controllers 120 typically process incoming read and write requests based on an order of arrival. The bus controller 140 includes a queue 145 for processing bus transactions, such as bus transactions BTR1 through BTRn, discussed further below.

A shared main memory 150 is also connected to the bus 130. A cache 110 may store one or more blocks of data, each of which is a copy of data stored in the main memory 150 or a modified version of data stored in main memory. As previously indicated, bus snooping is a technique used in a shared memory system, such as the shared memory system 100 of FIG. 1, to achieve coherency among the caches 110-1 through 110-N. The cache controllers 120-1 through 120-N monitor the bus 130, listening for broadcasts (snoop phase/data phase broadcasts) that may cause a cache controller 120 to invalidate its cache line.

As used herein, a transaction for an entry in a cache 110-1 through 110-N that is processed by a cache controller 120-1 through 120-N is referred to as a cache transaction CTRn, where n is a counter value. When a cache controller forwards a given cache transaction CTRn to the bus controller 140 for further processing, the transaction is stored in the queue 145 and is referred to as a bus transaction BTRn. According to one aspect of the invention, when an earlier cache transaction CTR1 for an entry in at least one cache is processed, some of the broadcast information obtained for CTR1 is re-used when processing a subsequent cache transaction CTR2 for the same block of main memory 150.

A bus transaction BTRn has an address phase (A_PHASE), a snoop response phase (R_PHASE) and a data phase (D_PHASE), in a known manner. The address phase continues until the snoop request along with the address of a cache line is issued to all cache controllers 120. The snoop response phase corresponds to the time from when the bus controller 140 places a snoop request until the time when the bus controller 140 receives snoop responses from all of the cache controllers 120. The data phase corresponds to the time from when the bus controller 140 receives the snoop responses until the time when the cache controllers 120 respond with data for the bus transaction. As discussed hereinafter, the bus controller 140 facilitates the process of broadcasting the information in the snoop and data phases for an earlier cache transaction CTRn to all of the cache controllers 120 for the peer caches 110. The broadcast information improves performance by reducing the bus access latency, when processing a subsequent cache transaction CTRn. Thus, the cache controllers 120 do not have to issue a new bus transaction BTR if the cache controllers 120 have any pending cache transaction CTR to the cache line for which the snoop/data response is being broadcast and if the cache transaction CTR is not yet issued to the bus controller. The source cache controller can perform a single data phase for multiple outstanding transactions in the bus controller and cache controllers for the same cache line. In this manner, data is re-used by a plurality of cache controllers 120.

When the bus controller 140 receives an incoming bus transaction BTR1 corresponding to a cache transaction CTR1 for an entry in at least one cache, the bus controller 140 issues a snoop request for the entry to cache controllers 120. The bus controller 140 collects the snoop responses (e.g., a main memory address stored by the cache and the corresponding cache state) from the cache controllers 120 and broadcasts a combined snoop response to the cache controllers 120. In addition, the bus controller 140 instructs the source cache to broadcast the cache line data during a data phase to the various cache controllers 120. There are two aspects to the cache line data. A data phase broadcast refers to the information that is sent by a cache controller 120 (referred to as the source cache) at the request of the bus controller 140 to all of the peer caches 110 and the bus controller 140 at the same time. This is done during the data response phase of the bus transaction. The term "snoop phase broadcast" is used to refer to the information (combined snoop response) sent by the bus controller 140 to all of the snooper caches 110 in the system at the same time. In this manner, aspects of the invention allow a subsequent cache transaction CTR2 for the same entry to be processed in one of cache 120-1 to cache 120-$n$ based on the broadcast combined snoop response and/or the broadcast cache line data.

Additional aspects of the invention allow a subsequent cache transaction CTR2 for the same main memory entry to be processed as a bus transaction BTR2 by the bus controller 140 based on a current phase of the already existing bus transaction BTR1 that is already being processed (e.g., whether the bus transaction BTR1 is in an address phase, a snoop response phase or a data phase). For example, a common data phase can be performed for bus transactions BTR1 and BTR2 associated with two cache transactions CTR1 and CTR2, respectively, for the same main memory address.

According to another aspect of the invention, exemplary sideband signals, discussed further below in conjunction with FIG. 2, are used to broadcast the snoop response and data phase results of the current outstanding transaction in the bus controller 140 to all of the cache controllers 120. In this manner, the cache controllers 120 that are snoopers can decide not to issue the bus transaction (based on the broadcast information) or can directly make use of the data (from the data phase) based on the nature of transaction.

FIG. 2 is a sample table illustrating exemplary sideband signals employed by an embodiment of the present invention. For example, as discussed further below, an exemplary combined snoop response is broadcast with Rphase_address/NO_ALLOC[CACHEn]/INVALIDATE [CACHEn] so that cache controllers 120 that are yet to issue a bus transaction BTRn, need not initiate a new bus transaction BTRn for the same cache line as it would also subsequently receive the respective broadcast snoop response as well as the broadcast data from the data phase. An exemplary data phase response is broadcast with Dphase_address/NO_ALLOC [CACHEn]/

INVALIDATE [CACHEn] as sideband signals to combine multiple data phases for each outstanding transaction in the bus controller 140 into a single data phase.

Generally, the Rphase_address signal indicates a cache line address of a transaction whose snoop response phase is in progress. The Dphase_address signal indicates a cache line address of a transaction whose data phase is in progress. The NO_ALLOC [CACHEn] signal indicates to CACHEn that it can make use of the data but not allocate. As shown in FIG. 2, the NO_ALLOC [CACHEn] signal is sent by the bus controller 140 to all peer caches. The caches that have pending READ operations can make use of this data without allocating the cache line. Finally, the INVALIDATE [CACHEn] signal is sent by the bus controller 140 to all caches that have a copy of the cache line to indicate that these caches should invalidate the cache line as the bus controller 140 is going to source this data for a write that is pending in its queue.

Thus, aspects of the present invention are operative when an earlier bus transaction BTR1 corresponding to a first cache transaction CTR1 is already being processed by the bus controller 140 when another cache controller 120 receives a subsequent cache transaction CTR2 for the same cache line. A number of different cases are discussed further below in conjunction with FIGS. 4 through 9, based on variations of the arrival sequence of the subsequent cache transaction CTR2 with respect to the earlier bus transaction BTR1. In some cases, the number of bus transactions BTRn that need to be initiated by the cache controllers 120 is reduced, as the subsequent cache transaction CTR2 does not have to enter the bus controller 140 (and thus BTR2 is never generated). In these cases, the subsequent cache transaction CTR2 is processed solely by the cache controller 120, making use of the information broadcast by the bus controller 140 for the earlier bus transaction BTR1 depending on the nature of CTR2. For other cases, the subsequent cache transaction CTR2 enters the bus controller 140 as bus transaction BTR2, and the second bus transaction BTR2 is processed with reduced bus latency and in turn improved performance by the bus controller 140 using disclosed bus transaction merging techniques based on the phase of BTR1, using information broadcast for the same cache line to reduce the number of bus transaction phases to snooper caches.

FIG. 3 is a flow chart describing a conventional cache coherency process 300 for a subsequent read/write bus transaction BTR2 in the event of a cache miss. A cache miss refers to a failed attempt to read or write a piece of data in the cache in the case where the data is not currently in the cache, resulting in a main memory access with longer latency. It is noted that a bus transaction BTRn is not required in the event of a cache hit, since the cache controller 120 can directly process the cache transaction CTRn. A cache hit occurs when the memory location is found in a cache. As shown in FIG. 3, a cache transaction CTR2, such as a read/write request for address A, is initially received by a cache controller 120, such as a cache controller 120-3 controlling cache 3 (110-3), during step 310.

During step 320, the cache coherency process 300 waits for the cache controller 120-3 to process the cache transaction CTR2 for address A. The request being processed by the cache controller 120-3 is sent to the bus controller 140 during step 330.

A test is performed during step 340 by the bus controller 140, to determine if there is already a bus transaction pending for the same cache line A. If it is determined during step 340 that there is already a bus transaction pending for the same cache line A, then the bus controller 140 issues a response to the cache controller 120-3 asking the cache controller 120-3 to retry the request later, during step 350, to allow the earlier bus transaction for the same address A to complete. If, however, it is determined during step 340 that there is not a bus transaction pending for the same cache line A, then program control proceeds to step 360.

A snoop request is issued by the bus controller 140 to each of the cache controllers 120 for the peer caches 110 during step 360. Generally, each cache controller 120 checks if the corresponding cache contains the copy of the requested cache line. The bus controller 140 collects the snoop responses indicating the state of the cache line in each of the snooper caches from the respective cache controllers 120 for the peer caches during step 370.

During step 380, the bus controller 140 determines whether any of the peer caches contain the requested cache line, identifies the 'source cache' that can provide the data for the requested cache line and requests the cache controller 120 associated with the cache owning the cache line to source the data and perform the data phase. The data phase is performed during step 390 by the cache controller 120 associated with the source cache and the data is sent by the bus controller 140 to requesting cache controller 120-3 associated with the cache 110-3.

As indicated above, five (5) different exemplary cases are discussed in conjunction with FIGS. 4 through 9, based on variations in arrival sequence of a cache transaction CTR2 with respect to an earlier bus transaction BTR1. Based on the nature of the cache transaction (CTR2), in cases 3 and 4, the number of bus transactions BTRn that need to be initiated by the cache controllers 120 is reduced, as the subsequent cache transaction CTR2 does not have to enter the bus controller 140 (and thus BTR2 is never generated). In cases 3 and 4, the subsequent cache transaction CTR2 is processed solely by the cache controller 120 (based on the nature of the cache transaction), making use of the information previously broadcast by the bus controller 140 for the earlier bus transaction BTR1.

In all five cases, cache controllers 120 make use of sideband signals that are part of the broadcast snoop response and the broadcast data response phases in order to manage their associated caches 110. Sideband signal NO_ALLOC [CACHEn] is used by the cache controller 120 to determine whether the CTR2 cache line could be allocated in the associated cache 110. If any of the bus transactions that are going to make use of these broadcast snoop/data responses is a write transaction, then the bus controller sets a logic '1' on the NO_ALLOC[CACHEn] signal for all of the peer caches 110 except for the peer cache 110 that sent the write transaction. Hence, only the peer cache 110 that initiated this bus write (BTR1) can allocate this cache line and other peer caches 110 can only make use of this data and should not allocate this cache line for cache transaction CTR2.

Sideband signal INVALIDATE[CACHEn] is sent by the bus controller 140 during the broadcast of snoop response phase/data response phase based on the combined snoop response and the nature of the bus transactions that are making use of these broadcast snoop/data response phases. If any of the bus transactions that are making use of the broadcast phases is a write, then the bus controller sets the INVALIDATE[CACHEn] signal to logic level '1' for all of the peer caches 110 that currently have a copy of the same cache line. Based on this information, the peer caches 110 for which INVALIDATE[CACHEn] is set invalidate this cache line address in order to maintain cache coherency as the impending bus write is going to modify the data.

The five addressed cases are distinguished based on one or more criteria. Cases 1, 2 and 5 are distinguished based on the phase of the earlier bus transaction BTR1. For Case 1, the earlier bus transaction BTR1 is waiting in the bus controller 140 for its address phase to start. For Case 2, the earlier bus transaction BTR1 is present in the bus controller 140 with its address phase complete and waiting for the snoop response phase to start. For Case 5, the earlier bus transaction BTR1 is present in the bus controller 140 with the address phase and snoop response phase complete and waiting for the data phase to start.

For cases 3 and 4, the subsequent cache transaction CTR2 is processed solely by the cache controller 120 (based on the nature of the transaction), making use of the information previously broadcast by the bus controller 140 for the earlier bus transaction BTR1 thereby saving a bus transaction BTR2 if CTR2 is a read operation. For Case 3, a snoop response is received for the earlier bus transaction BTR1. For Case 4, a data response is received for the earlier bus transaction BTR1.

For cases 1, 2 and 5, the subsequent cache transaction CTR2 enters the bus controller 140 as bus transaction BTR2 and is processed with reduced latency (thereby improved performance) by the bus controller 140 using disclosed bus transaction merging techniques based on the phase of the earlier bus transaction BTR1. This is achieved by using information broadcast for the same cache line from the earlier bus transaction BTR1, to reduce the number of bus transaction phases to snooper caches.

In cases 1, 2 and 5, when the cache controller 120 associated with the subsequent cache transaction CTR2 has to place a corresponding bus transaction BTR2, a bus transaction BTR1 associated with an earlier outstanding read/write request for the same cache line is already present in the bus controller 140.

For case 3, before the subsequent cache transaction CTR2 is processed and sent to the bus controller 140, the combined snoop response for the earlier bus transaction BTR1 is broadcast by the bus controller 140 on the bus 130, and can be used by the cache controller 120 associated with the subsequent cache transaction CTR2.

For case 4, before the subsequent cache transaction CTR2 is processed (although it misses the combined snoop response), the broadcast data phase for the earlier bus transaction BTR1 for the same cache line is observed on the bus 130 and is used by the cache controller 120 associated with the subsequent cache transaction CTR2.

Figure 4:
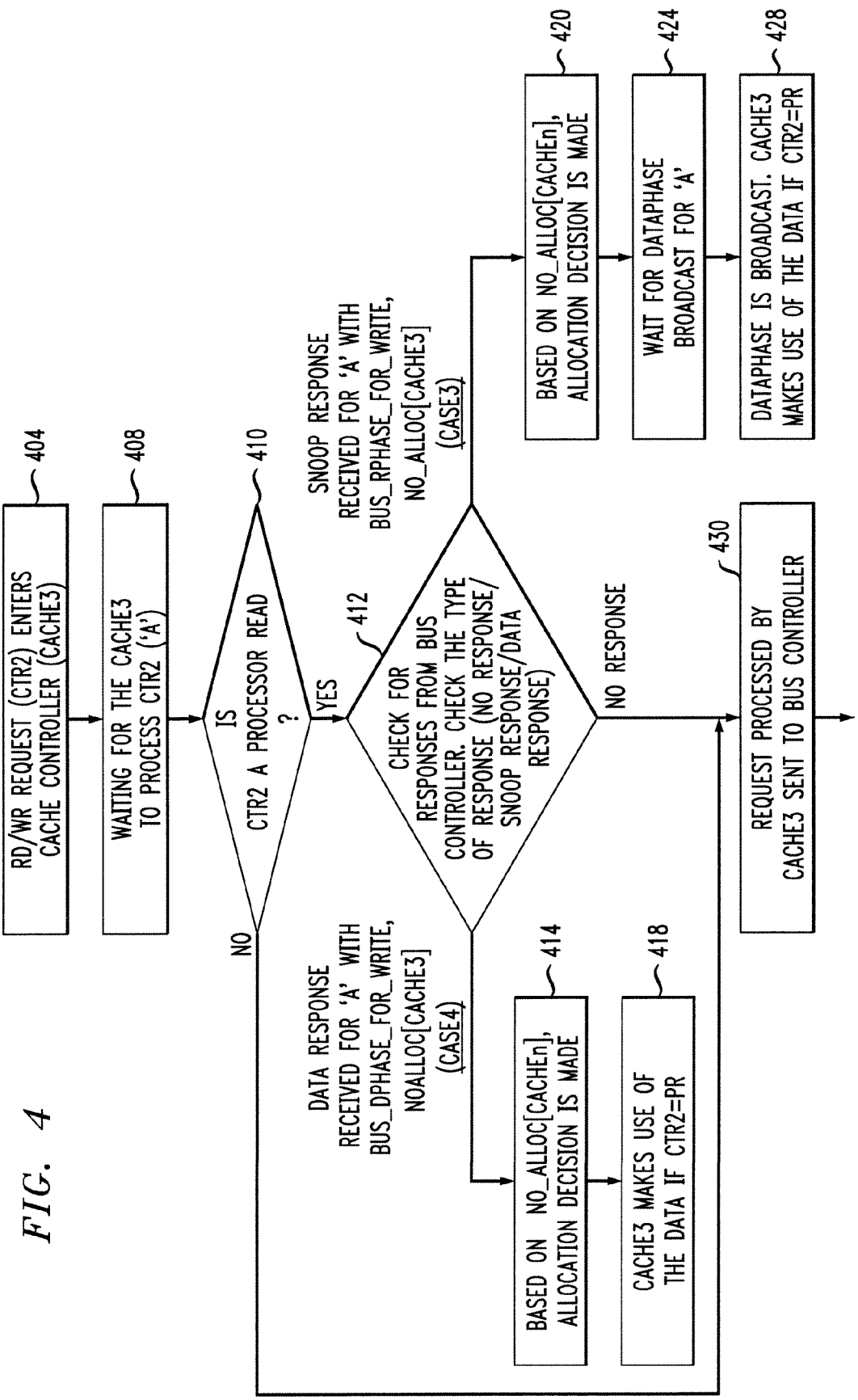
FIG. 4 is a flow chart describing an exemplary cache coherency process that incorporates aspects of the present invention.
Figure 4:
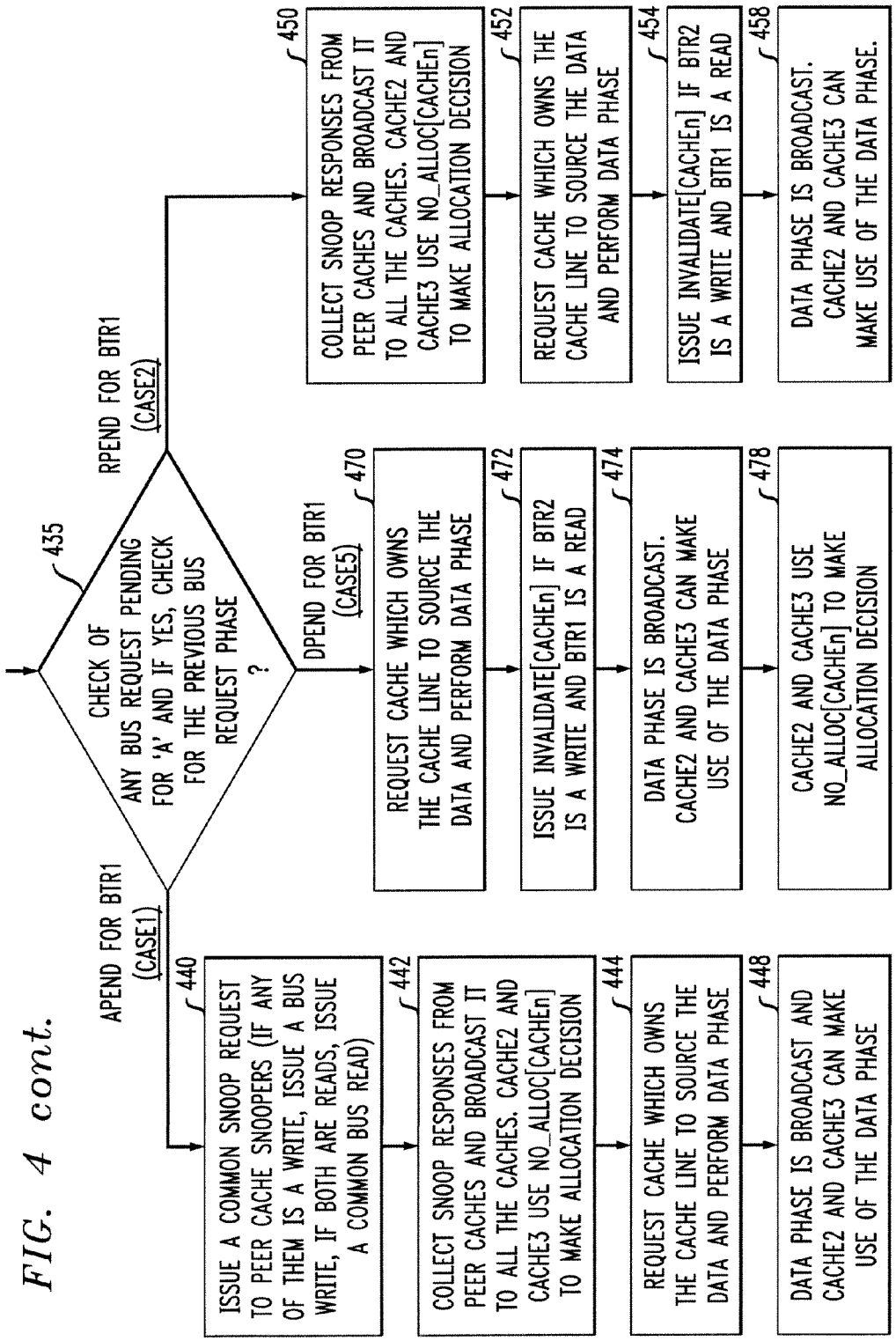

FIG. 4 is a flow chart describing a cache coherency process 400 for a subsequent cache transaction CTR2 that incorporates aspects of the present invention. As shown in FIG. 4, a cache transaction CTR2, such as a read/write request for address A, is initially received by a cache controller 120, such as a cache controller 120-3 controlling cache 3 (110-3), during step 404. During step 408, the cache coherency process 400 waits for the cache controller 120-3 to process the cache transaction CTR2 for address A.

A test is performed in step 410 to determine if cache transaction CTR2 is a read transaction. If cache transaction CTR2 is a processor write based operation, the cache controller 120-3 proceeds directly to issue CTR2 to the bus controller as bus transaction BTR2 during step 430, discussed below. If in step 410, it is determined that the cache transaction is a processor read, the cache controller 120-3 proceeds to step 412.

A test is performed periodically during step 412 while CTR2 is waiting to be issued to the bus by the cache controller 120-3 associated with cache 110-3, to determine if a response is received for address A from the bus controller 140. The received response for address A may be a broadcast data response, a broadcast snoop response, or another type of response, or no response at all. If it is determined during step 412 that a broadcast data response is received, then the cache controller 120 proceeds to step 414 to perform "case 4" processing, as discussed further below in conjunction with FIG. 8. As discussed above in conjunction with FIG. 2, an exemplary broadcast data phase response for address 'A' comprises asserting NO_ALLOC [CACHEn] as sideband signal. The cache controller 120-3 makes an allocation decision during step 414 based on the sideband signal NO_ALLOC [CACHEn] (see FIG. 2). If NO_ALLOC[CACHEn] (in this case NO_ALLOC[CACHE Controller 120-3]) is set to logic level high, the cache controller 120-3 can make use of the data if CTR2 is a processor read. However, it should not allocate this cache line in its respective cache, Cache 110-3. As discussed further below in conjunction with FIG. 8, the cache controller 120-3 makes use of the data during step 418, if the current cache transaction CTR2 is a processor read operation.

If it is determined during step 412 that a broadcast combined snoop response is received, then the cache controller 120 proceeds to step 420 to perform "case 3" processing, as discussed further below in conjunction with FIG. 7. As discussed above in conjunction with FIG. 2, an exemplary broadcast combined snoop response for address 'A' comprises asserting NO_ALLOC [CACHEn] as a sideband signal. As discussed further below in conjunction with FIG. 7, the cache controller 120-3 makes an allocation decision during step 420 based on the sideband signal NO_ALLOC [CACHEn] (in this case NO_ALLOC[CACHE Controller 120-3]). If NO_ALLOC[CACHEn] is set to logic level high, the cache controller 120-3 can make use of the data if CTR2 is a processor read. However, the cache controller 120-3 should not allocate this cache line in its respective cache, Cache 110-3. (See FIG. 2). The cache controller 120-3 waits for the data phase broadcast for address A associated with BTR1 during step 424. Once the data phase for address A is broadcast for BTR1, the cache controller 120-3 makes use of the data during step 428, if the current cache transaction CTR2 is a processor read operation. If NO_ALLOC [CACHEn] is 1, it should not allocate the cache line.

If it is determined during step 412 that another type of response is received (something other than a broadcast data response or a broadcast snoop response), then the cache controller 120 proceeds to step 430 to perform further processing for cases 1, 2 and 5. The request being processed by the cache controller 120-3 is sent to the bus controller 140 during step 430 for further processing. A further test is performed during step 435 to determine if there is a bus transaction phase for any bus transaction BTR that is pending for the same address A (i.e., detect a collision).

If it is determined during step 435 that the bus transaction phase for a pending bus transaction for address A is still in an address phase, then program control proceeds to step 440 for "case 1" processing, as discussed further below in conjunction with FIG. 5. The bus controller 140 issues a common snoop request to the cache controllers 120 associated with the peer caches 110 during step 440. If any of the requests is a write request, then the bus controller 140 issues a Bus Write signal as a part of the snoop request. If both requests are read requests, then the bus controller 140 issues a bus read signal as a part of the snoop request.

The bus controller 140 collects snoop responses from the cache controllers 120 associated with the snooper caches 110 during step 442 and broadcasts a combined snoop response to all of the cache controllers 120 associated with the peer caches 110. In addition, the cache controllers 120 associated with the peer caches 110-2 and 110-3 use the NO_ALLOC [CACHEn] sideband signal to make allocation decisions.

The bus controller 140 requests the cache controller 120 associated with the cache 110 that owns the cache line to source the data and perform the data phase during step 444. The data phase is broadcast during step 448 and the cache controllers 120 associated with the peer caches 110-2 and 110-3 (i.e., the other cache controllers 120 that are not associated with the cache 110-1 which is the source cache for the bus transaction BTR1 for which the data phase was broadcast) can make use of the broadcast data phase.

If it is determined during step 435 that the bus transaction phase for a pending bus transaction for address A is in a snoop response phase i.e., address has been sent to all snooper caches), then program control proceeds to step 450 for "case 2" processing, as discussed further below in conjunction with FIG. 6. The bus controller 140 collects snoop responses from the cache controllers 120 associated with the peer caches 110 during step 450 and broadcasts a combined snoop response to all of the cache controllers 120 associated with the peer caches 110. In addition, the cache controllers 120 associated with the peer caches 110-2 and 110-3 use the NO_ALLOC [CACHEn] sideband signal to make allocation decisions.

The bus controller 140 requests the cache controller 120 associated with the cache 110 that owns the cache line to source the data and perform the data phase during step 452. The bus controller 140 issues an INVALIDATE[CACHEn] sideband signal during step 454 if the subsequent bus transaction BTR2 is a write request and the earlier bus transaction BTR1 is a read request in order to inform all of the peer caches to invalidate the cache line if they have a copy of the same cache line. The data phase is broadcast during step 458 and the cache controllers 120 associated with the peer caches 110-2 and 110-3 (i.e., the other cache controllers 120 that are not associated with the cache 110-1 which is the source cache for the bus transaction BTR1 for which the data phase was broadcast) can make use of the broadcast data phase.

If it is determined during step 435 that the bus transaction phase for a pending bus transaction for address A is a data phase (i.e., the address phase is over for the earlier bus transaction BTR1), then program control proceeds to step 470 for "case 5" processing, as discussed further below in conjunction with FIG. 9. The bus controller 140 requests the cache controller 120 associated with the cache 110 that owns the cache line to source the data and perform the data phase during step 470.

The bus controller 140 issues an INVALIDATE[CACHEn] sideband signal during step 472 if the subsequent bus transaction BTR2 is a write request and the earlier bus transaction BTR1 is a read request in order to inform all of the peer caches to invalidate the cache line if they have a copy of the same cache line. The data phase is broadcast during step 474 and the cache controllers 120 associated with the peer caches 110-2 and 110-3 (i.e., the other cache controllers 120 that are not associated with the cache 110-1 which is the source cache for the bus transaction BTR1 for which the data phase was broadcast) can make use of the broadcast data phase. The cache controllers 120 associated with the peer caches 110-2 and 110-3 use the NO_ALLOC [CACHEn] sideband signal to make allocation decisions.

Cases 1 through 5 are discussed in sequence hereinafter in conjunction with FIGS. 5 through 9. For cases 1, 2 and 5, when the cache controller 120 associated with the subsequent cache transaction CTR2 has to place a corresponding bus transaction BTR2, a bus transaction BTR1 associated with an earlier outstanding read/write request for the same cache line is already present in the bus controller 140. Cases 1, 2 and 5 are distinguished based on the phase of the earlier bus transaction BTR1. For cases 3 and 4, the subsequent cache transaction CTR2 is processed solely by the cache controller 120 (based on the nature of the transaction), making use of the information previously broadcast by the bus controller 140 for the earlier bus transaction BTR1 thereby saving a bus transaction BTR2 if CTR2 is a read operation.

For each identified case, the delays are characterized as follows. BUS_CTRL_DLY_BTRn indicates the delay within the bus controller 140 to initiate the snoop request for the Nth transaction. RPhase_DLY indicates the worst case delay for a bus transaction from snoop address phase to receive responses from all of the snooper caches. DPhase_DLY indicates the worst case delay for a bus transaction from snoop response phase completion to reception of the complete data. Bus_Gnt_DLY indicates the worst case delay for a cache initiated transaction to get a grant from the bus controller.

FIGS. 5 through 9 are sample tables (each corresponding to a different Case) illustrating the processing of two cache transactions CTR1 and CTR2 issued by two cache controllers 120, and the details for the corresponding bus transactions, as well as the time savings achieved by aspects of the present invention. For each case, the first cache transaction CTR1 is issued by an exemplary cache controller 120-2 for a corresponding cache 2 (110-2), the second cache transaction CTR2 is issued by an exemplary cache controller 120-3 for a corresponding cache 3 (110-3) and the cache 1 (110-1) is considered to be sourcing the data for the bus write operations (BTRn). A bus write is a read operation requested by the bus controller 140 in order to service a processor write transaction issued to the bus controller (as BTRn) as a result of a cache miss.

Case 1

For Case 1, the earlier cache transaction CTR1 generated by cache controller 120-2 has reached the bus controller 140 as bus transaction BTR1 and is waiting in the bus controller 140 for its address phase to start (i.e., BTR1 is in an A_PEND state). The cache coherency process 400 determines during step 435 whether an address collision exists with other bus transactions BTRn and determines the phase of the earlier colliding bus transaction BTRn. If an address collision is detected during step 435, and the earlier colliding bus transaction BTR1 is in an A_PEND state, the bus controller 140 takes the actions shown in table 500 of FIG. 5 based on the relative nature of whether cache transactions CTR1 and CTR2, corresponding to BTR1 and BTR2, are processor read or processor write operations.

As shown in FIG. 5, if both CTR1 and CTR2 are processor read (PR) operations, a common bus read is issued during step 440 (FIG. 4), since both cache controllers 120-2 and 120-3 can allocate and complete the transaction together (i.e., the read transactions will not alter the cached content). If one of CTR1 and CTR2 is a processor write (PW) operation, a common bus write is issued for the write operation during step 440 (FIG. 4), and if any of the cache controllers 120 is associated with the read cache transaction, it is instructed not to allocate the cache line using the NO_ALLOC sideband signal (since the value being read can be changed by the write operation). The time savings is equal to the worst delay incurred to issue the snoop address phase for BTR2, plus the worst case delay for a bus transaction from the snoop address phase to reception of the response from all of the snooper caches plus the worst case delay for a bus transaction from the snoop response phase completion to reception of the complete data.

If both CTR1 and CTR2 are processor write (PW) operations, the bus controller 140 accepts the bus transaction that arrives first and defers the second bus transaction until the first bus transaction is completed. There is no time savings when both CTR1 and CTR2 are processor write (PW) operations, since both transactions modify data and the second transaction must wait until the first transaction completes to maintain the data coherency.

Case 2

For Case 2, the earlier bus transaction BTR1 is present in the bus controller 140 with its address phase complete and waiting for the snoop response phase to start (i.e., BTR1 is in an R_PEND state). Generally, the cache controller 120-3 associated with the subsequent cache transaction CTR2 which results in bus transaction BTR2, can benefit from the broadcast snoop response and data phase of the earlier bus transaction BTR1. The cache coherency process 400 determines during step 435 whether an address collision exists with other cache transactions CTRn and determines the phase of the earlier colliding bus transaction BTRn. If an address collision is detected during step 435, and the earlier colliding bus transaction BTR1 is in an R_PEND state, the bus controller 140 takes the actions shown in table 600 of FIG. 6 based on the relative nature of whether cache transactions CTR1 and CTR2 are read or write operations.

As shown in FIG. 6, if both CTR1 and CTR2 are processor read (PR) operations, the bus transaction BTR2 can leverage the snoop address phase of BTR1 issued earlier by just reusing the same snoop response of BTR1 during step 450 (FIG. 4). In this case, the snoop address phase has already been issued for BTR1 and then BTR2 reaches the bus controller 140. Both Cache controllers 120-2 and 120-3 can allocate and complete the transaction together (i.e Read transaction will not alter the cached content). If CTR1 is a processor read (PR) and CTR2 is a processor write (PW) operation, the bus transaction BTR2 (bus write operation) can leverage the snoop address phase of BTR1 issued earlier during step 450 (FIG. 4), and the cache controller 120 associated with the read cache transaction (i.e. cache controller 120-2 for CTR1) is instructed not to allocate using the NO_ALLOC sideband signal (since the value being read will be changed by the write operation). In addition, if the subsequent cache transaction CTR2 is a processor write operation, the sideband signal INVALIDATE[CACHE1] is used during step 454 (FIG. 4) to instruct the cache controller 120-1 for cache 1 (110-1) to invalidate along with the data phase broadcast. As cache controller 120-1 is sourcing the data and BTR2 is a bus write operation, the cache 110-1 associated with cache controller 120-1, has to invalidate the cache line as the same cache line is going to be modified by BTR2. If CTR 1 is a processor write (PW) and CTR2 is a processor read (PR) operation, the bus transaction BTR2 (bus read operation) can leverage the snoop address phase of BTR1 issued earlier during step 450 (FIG. 4), and the cache controller 120 associated with the read cache transaction (i.e. cache controller 120-3 for CTR2) is instructed not to allocate the cache line using the NO_ALLOC sideband signal (since the value being read will be changed by the write operation). The time savings is again equal to the worst case delay for BTR2's snoop request (address phase) to be issued, plus the worst case delay for a bus transaction from the snoop address phase to reception of responses from all of the snooper caches plus the worst case delay for a bus transaction from snoop address phase completion to reception of the complete data.

If both CTR1 and CTR2 are processor write (PW) operations, the bus controller 140 accepts the bus transaction that arrives first and defers the second bus transaction until the first bus transaction is completed. There is no time savings when both CTR1 and CTR2 are processor write (PW) operations, since both transactions modify data and the second transaction must wait until the first transaction completes.

Case 3

For Case 3, before the subsequent cache transaction CTR2 is processed and sent to the bus controller 140, the combined snoop response for the earlier bus transaction BTR1 is broadcast by the bus controller 140 on the bus 130, and can be used by the cache controller 120 associated with the subsequent cache transaction CTR2. Generally, before the cache controller 120-3 associated with the subsequent cache transaction CTR2 forwards the subsequent cache transaction CTR2 to the bus controller 140, the cache controller 120-3 associated with the subsequent cache transaction CTR2 detects the earlier bus transaction BTR1 for the same main memory address during step 412 and waits for the broadcast snoop response.

In such a scenario, the address of the earlier bus transaction BTR1 is broadcast by the bus controller 140 once it receives the snooper response. This information is used by the cache controllers, such as the cache controller 120-3 associated with the subsequent cache transaction CTR2, to avoid sending a bus transaction BTRn for the same cache line. As discussed hereinafter, if one of the earlier bus transactions (BTR1) is a processor write transaction (PW), no allocate is signaled through the sideband signals NO_ALLOC [CACHEn] instructing peer caches not to allocate the cache line. When NO_ALLOC[CACHEn] is set to logic level high, the cache controller 120-3 could make use of the data, if CTR2 is a processor read. However, cache controller 120-3 should not allocate this cache line in its respective cache, Cache 110-3. Even when NO_ALLOC[CACHEn] is '0' in the snoop response phase, the ultimate usage of the broadcast data phase will be based on a NO_ALLOC[CACHEn] during the data phase (as discussed in Case 4). The broadcast snoop response data can be used by the cache controller 120-3 associated with the subsequent cache transaction CTR2 if the subsequent cache transaction CTR2 is only a processor read operation (which is determined in step 410). If CTR2 in cache controller 120-3 is a processor write, the transaction needs to be issued to the bus controller (step 430). If a snoop response is detected for address A during step 412, the cache controller 120-3 associated with the subsequent cache transaction CTR2 takes the actions shown in table 700 of FIG. 7 based on the relative nature of whether cache transactions CTR1 and CTR2 are read or write operations.

As shown in FIG. 7, if CTR2 is a processor read (PR) operation, a processor read (PR) operation is not issued on the bus 130 for CTR2 as a bus transaction BTRn, as the cache controller 120-3 detects a snoop response for the same main memory address associated to CTR1 during step 412 (FIG. 4). In addition, if CTR1 is a processor write (PW) operation, the cached content will be modified in cache 120-2 and the cache controller 120-3 should not allocate. Thus, the sideband signal NO_ALLOC[CACHEn] is set to indicate that the cache controller 120-3 should not allocate.

As shown in FIG. 7, if cache transaction CTR2 is a processor write (PW) operation, the bus controller 140 accepts the bus transaction that arrives first and defers the second bus transaction until the first bus transaction is completed. The entire bus transaction is saved when cache transaction CTR2 is a processor read (PR) operation. There is no bus cycle time savings when CTR2 is a processor write (PW) operation.

Case 4

For Case 4, before the subsequent cache transaction CTR2 is processed (although it misses the combined snoop response), the broadcast data phase for the earlier bus transaction BTR1 for the same cache line is observed on the bus 130 and is used by the cache controller 120 associated with the subsequent cache transaction CTR2. During the data phase for the earlier bus transaction BTR1, the main memory address associated with BTR1 is broadcast to all of the cache controllers 120. If the cache controller 120-3 associated with the subsequent cache transaction CTR2 determines during step 412 (FIG. 4) that the address associated with pending CTR2 matches the address broadcast for BTR1, the corresponding data can be used by the cache controller 120-3 associated with the subsequent cache transaction CTR2 only if CTR2 is a processor read (which is determined in step 410). If CTR2 is a processor write (determined in step 410), Cache controller 120-3 can proceed issuing this CTR2 as a bus write to the bus controller. In addition, the sideband signal NO_ALLOC [CACHEn] is signaled by the bus controller 140 if one of the earlier bus transactions BTR1 happens to be a write transaction.

If a data response is detected for address A during step 412, the cache controller 120-3 associated with the subsequent cache transaction CTR2 takes the actions shown in table 800 of FIG. 8 based on the relative nature of whether cache transactions CTR1 and CTR2 are read or write operations.

As shown in FIG. 8, if CTR2 is a processor read (PR) operation, a processor read (PR) operation is not issued on the bus 130 for CTR2 as a bus transaction BTRn, as the cache controller 120-3 detects a data response for the same main memory address for CTR1 during step 412 (FIG. 4). In addition, if CTR1 is a processor write (PW) operation, the cached content will be modified and the cache controller 120-3 should not allocate. Thus, the sideband signal NO_ALLOC [CACHEn] (NO_ALLOC[Cache Controller 120-3] in this case) is set to indicate that the cache controller 120-3 should not allocate the cache line.

As shown in FIG. 8, if CTR2 is a processor write (PW) operation, the bus controller 140 accepts the bus transaction that arrives first and defers the second bus transaction until the first bus transaction is completed. An entire bus transaction is saved when CTR2 is a processor read (PR) operation and there is no time savings when CTR2 is a processor write (PW) operation.

Case 5

For Case 5, the earlier bus transaction BTR1 is present in the bus controller 140 with the address phase and snoop response phase complete and waiting for the data phase to start. In case 5, if the bus controller 140 receives a subsequent bus transaction BTR2 for the same main memory address, the address phase of the subsequent bus transaction BTR2 is bypassed and the subsequent bus transaction BTR2 is placed in the data phase (D_PEND) if both bus transactions are not write operations. As discussed hereinafter, if one of the bus transactions is a write transaction, the second transaction BTR2 is deferred until the first transaction BTR1 completes and the second transaction BTR2 starts fresh with the address phase.

If an address collision is detected during step 435, and the earlier colliding bus transaction BTR1 is in a D_PEND state, the bus controller 140 takes the actions shown in table 900 of FIG. 9 based on the relative nature of whether cache transactions CTR1 and CTR2 are read or write operations.

As shown in FIG. 9, if both CTR1 and CTR2 are processor read (PR) operations, the cache controller 120-3 associated with the subsequent cache transaction CTR2 reuses the broadcast data from the data response for the earlier cache transaction CTR1 and the bus controller 140 clears the subsequent cache transaction CTR2 once the data phase for the earlier cache transaction CTR1 is completed.

In addition, as shown in FIG. 9, if one of CTR1 and CTR2 is a processor write (PW) operation, the cache controller 120-3 associated with the subsequent cache transaction CTR2 reuses the broadcast data from the data response phase for the earlier cache transaction CTR1 and the bus controller 140 clears the subsequent cache transaction CTR2 once the data phase for the earlier cache transaction CTR1 is completed. In addition, if one cache transaction CTR is a processor write (PW) operation and the other cache transaction CTR is a processor read (PR) operation, the cache controller 120 associated with the read operation is instructed not to allocate the cache line through the sideband signal NO_ALLOC [CACHEn].

NO_ALLOC[CACHE controller 120-3] is used to inform cache controller 120-3 not to allocate in associated cache 110-3. Similarly, if CTR1 is a processor read (PR) and CTR2 is a processor write (PW), NO_ALLOC[CACHE controller 120-2] is used to inform cache controller 120-2 not to allocate the cache line in associated cache 110-2.

In addition, if the subsequent cache transaction CTR2 is a processor write operation, the sideband signal INVALIDATE [CACHEn] is used during step 472 (FIG. 4) to instruct the cache controller 120-1 for cache 1 (110-1) which is the source cache, to invalidate its entry as only a bus read was issued earlier and the later bus write corresponding to BTR2 is going to make use of this data and modify it along with the data phase broadcast. The time savings is again equal to the maximum delay incurred by the bus controller to initiate an address phase for BTR2, plus the worst case delay for a bus transaction from snoop address phase to reception of the responses from all of the snooper caches plus the worst case delay for a bus transaction from snoop address phase completion to reception of the complete data.

If both CTR1 and CTR2 are processor write (PW) operations, the bus controller 140 accepts the bus transaction that arrives first and defers the second bus transaction until the first bus transaction is completed. There is no time savings when both CTR 1 and CTR2 are processor write (PW) operations, since both transactions modify data and the second transaction must wait until the first transaction completes.

All of the above mentioned cases are described as examples for a bus controller system with a plurality of cache controllers processing two cache transactions (CTR1 and CTR2) waiting to be serviced and issuing bus transaction BTR1 and, in some cases, bus transaction BTR2. This reuse of broadcast data/snoop responses could be extended further to multiple outstanding bus transactions (BTR[1 . . . n]) with multiple outstanding cache transactions (CTR[1 . . . n] being serviced by the bus controllers or yet to be issued to the bus controller) by making use of the broadcast sideband signals (INVALIDATE[CACHEn] and NO_ALLOC[CACHEn]) appropriately.

As previously indicated in the arrangements of bus controller and cache controller systems, as described herein, provide a number of advantages relative to conventional arrangements. Again, it should be emphasized that the above-described embodiments of the invention are intended to be illustrative only. In general, the exemplary bus controller and cache controller systems can be modified, as would be apparent to a person of ordinary skill in the art, to incorporate the re-use of snooper response and data phase results in accordance with the present invention. In addition, the disclosed snoop address phase, snoop response phase and data phase result re-use techniques can be employed in any bus controller or buffered cache controller system, irrespective of the underlying cache coherency protocol. Among other benefits, the present invention provides faster cache line access and reduced dynamic power consumption.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

In an integrated circuit implementation of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

A typical integrated circuit design flow starts with an architectural design specification. All possible inputs are considered at this stage for achieving the required functionality. The next stage, referred to as Register Transfer Logic (RTL) coding, involves coding the behavior of the design (as decided in architecture) in a hardware description language, such as Verilog, or another industry-standard hardware description language. Once the RTL captures the expected design features, the RTL is applied as an input to one or more Electronic Design and Automation (EDA) tools.

The EDA tool(s) convert the RTL code into the logic gates and then eventually into a GDSII (Graphic Database System) stream format, which is an industry-standard database file format for data exchange of integrated circuit layout artwork. The GDSII stream format is a binary file format representing planar geometric shapes, text labels, and other information about the layout in hierarchical form, in a known manner. The GDSII file is processed by integrated circuit fabrication foundries to fabricate the integrated circuits. The final output of the design process is an integrated circuit that can be employed in real world applications to achieve the desired functionality.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

It is to be understood that the embodiments and variations shown and described herein are merely illustrative of the principles of this invention and that various modifications may be implemented by those skilled in the art without departing from the scope and spirit of the invention.

We claim:

1. A method, comprising:
receiving an incoming bus transaction BTR1 corresponding to an incoming cache transaction CTR1 for an entry in at least one cache;

issuing a snoop request with a cache line address of said incoming bus transaction BTR1 for said entry to a plurality of cache controllers;

collecting at least one snoop response from said plurality of cache controllers;

broadcasting a combined snoop response for said entry to said plurality of cache controllers, wherein said combined snoop response is a combination of said at least one snoop response from said plurality of cache controllers; and broadcasting cache line data from a source cache for said entry during a data phase to said plurality of cache controllers, wherein a subsequent cache transaction CTR2 in at least one of said plurality of cache controllers for said entry is processed based on said broadcast combined snoop response and said broadcast cache line data by aligning bus transaction phases corresponding to said subsequent cache transaction CTR2 with respect to a current bus transaction phase of said bus transaction BTR1 using bus transaction merging techniques based on a phase of said bus transaction BTR1 in a queue of a bus controller.

2. The method of claim 1, further comprising the step of processing said subsequent cache transaction CTR2 for said entry in said bus controller based on said current bus transaction phase of said bus transaction BTR1.

3. The method of claim 2, further comprising the step of performing a common data phase for bus transactions BTR1 and BTR2 associated with said incoming cache transaction CTR1 and said subsequent cache transaction CTR2, respectively.

4. The method of claim 2, wherein said current bus transaction phase is an address phase and wherein cache controllers associated with said incoming request CTR1 and said subsequent cache transaction CTR2 use said broadcast cache line data if said corresponding cache transactions CTR1 and CTR2 are both not write operations.

5. The method of claim 2, wherein said current bus transaction phase is a snoop response phase and wherein cache controllers associated with said incoming request CTR1 and said subsequent cache transaction CTR2 use said broadcast cache line data if said corresponding cache transactions CTR1 and CTR2 are both not write operations.

6. The method of claim 2, wherein said current bus transaction phase is a data phase and wherein cache controllers associated with said incoming request CTR1 and said subsequent cache transaction CTR2 use said broadcast cache line data if said corresponding cache transactions CTR1 and CTR2 are both not write operations.

7. The method of claim 2, wherein said current bus transaction phase is one or more of a data phase and a response phase and further comprising the step of invalidating said entry in said source cache if said subsequent cache transaction for said entry comprises a write operation and said incoming cache transaction CTR1 is a read operation.

8. The method of claim 1, wherein said data phase further comprises the step of requesting said source cache to source data for said incoming bus transaction and to perform a data phase for said entry.

9. The method of claim 1, wherein a cache controller associated with said subsequent cache transaction CTR2 further comprises the step of waiting for said broadcast cache line data.

10. The method of claim 1, wherein a cache controller associated with said subsequent cache transaction uses said broadcast cache line data if said subsequent cache transaction for said entry comprises a read operation.

11. The method of claim 1, further comprising the step of generating an indicator to a cache controller to make use of said cache line data but not to allocate a cache entry.

12. The method of claim 1, wherein a cache controller associated with said subsequent cache transaction uses said broadcast cache line data if said subsequent cache transaction CTR2 for said entry comprises a read operation based on the snoop response broadcast of the earlier bus transaction BTR1 to the same cache line.

13. The method of claim 1, further comprising the step of generating an indicator to a cache controller to indicate that said broadcast combined snoop response corresponds to a write operation.

14. The method of claim 1, wherein a cache controller associated with said subsequent cache transaction uses said broadcast cache line data if said subsequent cache transaction for said entry comprises a read operation based on the snoop response broadcast of the earlier bus transaction BTR1 to the same cache line.

15. A bus controller, comprising:
a memory; and
at least one hardware device, coupled to the memory, operative to:
receive an incoming bus transaction BTR1 corresponding to an incoming cache transaction CTR1 for an entry in at least one cache;
issue a snoop request with a cache line address of said incoming bus transaction BTR1 for said entry to a plurality of cache controllers;
collect at least one snoop response from said plurality of cache controllers;
broadcast a combined snoop response for said entry to said plurality of cache controllers, wherein said combined snoop response is a combination of said at least one snoop response from said plurality of cache controllers; and
broadcast cache line data from a source cache for said entry during a data phase to said plurality of cache controllers, wherein a subsequent cache transaction CTR2 in at least one of said plurality of cache controllers for said entry is processed based on said broadcast combined snoop response and said broadcast cache line data by aligning bus transaction phases corresponding to said subsequent cache transaction CTR2 with respect to a current bus transaction phase of said bus transaction BTR1 using bus transaction merging techniques based on a phase of said bus transaction BTR1 in a queue of a bus controller.

16. The bus controller of claim 15, wherein said at least one hardware device is further configured to process said subsequent cache transaction CTR2 for said entry in said bus controller based on said current bus transaction phase of said bus transaction BTR1.

17. The bus controller of claim 16, wherein said at least one hardware device is further configured to perform a common data phase for bus transactions BTR1 and BTR2 associated with said incoming cache transaction CTR1 and said subsequent cache transaction CTR2, respectively.

18. The bus controller of claim 16, wherein said current bus transaction phase is an address phase and wherein cache controllers associated with said incoming request CTR1 and said subsequent cache transaction CTR2 use said broadcast cache line data if said corresponding cache transactions CTR1 and CTR2 are both not write operations.

19. The bus controller of claim 16, wherein said current bus transaction phase is a snoop response phase and wherein cache controllers associated with said incoming request CTR1 and said subsequent cache transaction CTR2 use said broadcast cache line data if said corresponding cache transactions CTR1 and CTR2 are both not write operations.

20. The bus controller of claim 16, wherein said current bus transaction phase is a data phase and wherein cache controllers associated with said incoming request CTR1 and said subsequent cache transaction CTR2 use said broadcast cache line data if said corresponding cache transactions CTR1 and CTR2 are both not write operations.

21. The bus controller of claim 16, wherein said current bus transaction phase is one or more of a data phase and a response phase and wherein said at least one hardware device is further configured to invalidate said entry in said source cache if said subsequent cache transaction for said entry comprises a write operation and said incoming cache transaction CTR1 is a read operation.

22. The bus controller of claim 15, wherein said data phase further comprises requesting said source cache to source data for said incoming bus transaction and to perform a data phase for said entry.

23. The bus controller of claim 15, wherein a cache controller associated with said subsequent cache transaction CTR2 is configured to wait for said broadcast cache line data.

24. The bus controller of claim 15, wherein a cache controller associated with said subsequent cache transaction uses said broadcast cache line data if said subsequent cache transaction for said entry comprises a read operation.

25. The bus controller of claim 15, wherein said at least one hardware device is further configured to generate an indicator to a cache controller to make use of said cache line data but not to allocate a cache entry.

26. The bus controller of claim 15, wherein a cache controller associated with said subsequent cache transaction uses said broadcast cache line data if said subsequent cache transaction CTR2 for said entry comprises a read operation based on the snoop response broadcast of the earlier bus transaction BTR1 to the same cache line.

27. The bus controller of claim 15, wherein said at least one hardware device is further configured to generate an indicator to a cache controller to indicate that said broadcast combined snoop response corresponds to a write operation.

28. The bus controller of claim 15, wherein a cache controller associated with said subsequent cache transaction uses said broadcast cache line data if said subsequent cache transaction for said entry comprises a read operation based on the snoop response broadcast of the earlier bus transaction BTR1 to the same cache line.

29. The bus controller of claim 15, wherein said at least one hardware device is one or more of an integrated circuit, a digital signal processor, a microprocessor, a micro-controller, and a general-purpose computer.

30. The bus controller of claim 15, wherein said bus controller is embodied on an integrated circuit.

31. An integrated circuit, comprising:
bus controller circuitry operative to:
receive an incoming bus transaction BTR1 corresponding to an incoming cache transaction CTR1 for an entry in at least one cache;
issue a snoop request with a cache line address of said incoming bus transaction BTR1 for said entry to a plurality of cache controllers; and
collect at least one snoop response from said plurality of cache controllers; and
broadcast circuitry operative to:
broadcast a combined snoop response for said entry to said plurality of cache controllers, wherein said combined snoop response is a combination of said at least one snoop response from said plurality of cache controllers; and broadcast cache line data from a source cache for said entry during a data phase to said plurality of cache controllers, wherein a subsequent cache transaction CTR2 in at least one of said plurality of cache controllers for said entry is processed based on said broadcast combined snoop response and said broadcast cache line data by aligning bus transaction phases corresponding to said subsequent cache transaction CTR2 with respect to a current bus transaction phase of said bus transaction BTR1 using bus transaction merging techniques based on a phase of said bus transaction BTR1 in a queue of a bus controller.

32. An article of manufacture, comprising a tangible machine readable recordable medium containing one or more programs which when executed implement the steps of:

receiving an incoming bus transaction BTR1 corresponding to an incoming cache transaction CTR1 for an entry in at least one cache;

issuing a snoop request with a cache line address of said incoming bus transaction BTR1 for said entry to a plurality of cache controllers;

collecting at least one snoop response from said plurality of cache controllers;

broadcasting a combined snoop response for said entry to said plurality of cache controllers, wherein said combined snoop response is a combination of said at least one snoop response from said plurality of cache controllers; and broadcasting cache line data from a source cache for said entry during a data phase to said plurality of cache controllers, wherein a subsequent cache transaction CTR2 in at least one of said plurality of cache controllers for said entry is processed based on said broadcast combined snoop response and said broadcast cache line data by aligning bus transaction phases corresponding to said subsequent cache transaction CTR2 with respect to a current bus transaction phase of said bus transaction BTR1 using bus transaction merging techniques based on a phase of said bus transaction BTR1 in a queue of a bus controller.

* * * * *